US009798986B2

(12) United States Patent
Bantz et al.

(10) Patent No.: US 9,798,986 B2
(45) Date of Patent: *Oct. 24, 2017

(54) APPARATUS AND METHODS FOR ACTIVITY-BASED MANAGEMENT OF COMPUTER SYSTEMS

(75) Inventors: David F Bantz, Portland, MA (US); Thomas E Chefalas, Somers, NY (US); Srikant Jalan, Cortlandt Manor, NY (US); Steven J Mastrianni, Unionville, CT (US); Clifford Alan Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 764 days.

This patent is subject to a terminal disclaimer.

(21) Appl. No.: 13/038,501

(22) Filed: Mar. 2, 2011

(65) Prior Publication Data
US 2012/0226898 A1 Sep. 6, 2012

(51) Int. Cl.
*G06Q 10/06* (2012.01)
*G06Q 10/10* (2012.01)

(52) U.S. Cl.
CPC .......... *G06Q 10/06* (2013.01); *G06Q 10/101* (2013.01)

(58) Field of Classification Search
CPC .................................................... G06Q 10/06
(Continued)

(56) References Cited

U.S. PATENT DOCUMENTS

| 6,845,396 B1 | 1/2005 | Kanojia et al. ............... 709/224 |
| 2002/0120786 A1 | 8/2002 | Sehayek et al. .............. 709/310 |

(Continued)

FOREIGN PATENT DOCUMENTS

| JP | 11-126160 A | 5/1999 |
| JP | 2000148276 A | 5/2000 |

(Continued)

*Primary Examiner* — Andrew Georgandellis
(74) *Attorney, Agent, or Firm* — Harrington & Smith

(57) ABSTRACT

Apparatus and methods are disclosed for performing computer system management on an activity basis. In one embodiment, computer-system-related items are associated with at least one activity to be performed using the computer system. Then, management procedures are established for the at least one activity. Next, when the computer system is used to perform the at least one activity, the computer-system-related items associated with the at least one activity are managed in accordance with the management procedures established for the at least one activity. In another embodiment, apparatus and methods monitor patterns of use of a computer system. Using information gathered during monitoring operations, activity models are formulated, and for each activity model a management plan is devised. After management plans have been devised for each activity model, the use of the computer system is monitored to identify actions being performed with the computer system. The identified actions are then compared with the activity models to determine which activity model best fits the identified actions. Management of computer-system-related items associated with the activity is then performed using the management plan associated with the activity model that best fits the actions being performed with the computer system.

13 Claims, 8 Drawing Sheets

(58) Field of Classification Search
USPC ........................................................ 709/223
See application file for complete search history.

(56) References Cited

U.S. PATENT DOCUMENTS

| | | |
|---|---|---|
| 2002/0133330 A1 | 9/2002 | Loisey et al. .................... 703/27 |
| 2002/0169858 A1 | 11/2002 | Bellinger et al. ............. 709/220 |
| 2004/0215702 A1 | 10/2004 | Hamasaki et al. ............ 709/201 |
| 2004/0219932 A1 | 11/2004 | Verteuil ...................... 455/456.2 |
| 2004/0246146 A1 | 12/2004 | Fomukong .................... 340/988 |
| 2005/0015641 A1* | 1/2005 | Alur .................... G06F 11/1458 714/2 |
| 2005/0066019 A1 | 3/2005 | Egan et al. .................... 709/223 |
| 2005/0091348 A1 | 4/2005 | Ferri et al. .................... 709/220 |
| 2005/0182773 A1 | 8/2005 | Feinsmith ...................... 707/100 |
| 2006/0026268 A1 | 2/2006 | Sanda ............................ 709/221 |
| 2006/0075001 A1 | 4/2006 | Canning et al. .............. 707/203 |
| 2006/0080656 A1 | 4/2006 | Cain et al. ..................... 717/174 |
| 2006/0184410 A1 | 8/2006 | Ramamurthy et al. ........... 705/8 |
| 2006/0291473 A1 | 12/2006 | Chase et al. ................ 370/395.5 |
| 2007/0078972 A1* | 4/2007 | Yagishita ...................... 709/224 |
| 2007/0162907 A1* | 7/2007 | Herlocker et al. ............. 718/100 |
| 2007/0297590 A1* | 12/2007 | Macbeth ................ G06Q 10/00 379/201.02 |
| 2009/0307162 A1* | 12/2009 | Bui ........................ G06N 5/022 706/12 |

FOREIGN PATENT DOCUMENTS

| | | |
|---|---|---|
| JP | 2002244870 A | 8/2002 |
| JP | 2004070594 A | 3/2004 |
| JP | 2005122707 A | 5/2005 |

\* cited by examiner

APPARATUS AND METHODS FOR ACTIVITY-BASED MANAGEMENT OF COMPUTER SYSTEMS

CROSS-REFERENCE TO RELATED APPLICATIONS

This patent application is a continuing application of U.S. application Ser. No. 11/473,805, filed Jun. 23, 2006, the disclosure of which is incorporated by reference in its entirety.

TECHNICAL FIELD

The invention generally concerns apparatus and methods for performing management, maintenance and upgrades of computer systems, and more particularly concerns apparatus and methods that perform management, maintenance and upgrades of computer systems on an activity basis.

BACKGROUND

Computer systems require constant management and maintenance. In one conventional paradigm applied on an institutional basis, computer systems sharing a baseline configuration are identified, and management and maintenance actions are performed on each of the computer systems sharing the baseline configuration. "Baseline configuration" refers to an initial hardware and software configuration shared by computer systems to receive maintenance or upgrades. When determining whether to perform maintenance on a particular computer system, or to upgrade a particular computer system, the primary criterion applied is whether a particular computer system in the target population shares the baseline configuration. If it does, maintenance is performed or upgrades are installed on the computer system.

In certain situations it has been realized that such a configuration-oriented approach to computer system management is sub-optimal. For example, although it may be desirable to perform maintenance or to install upgrades, actual execution of the maintenance or upgrades may be performed in an inefficient manner because unique needs of the users of the computer systems being maintained are not taken into consideration. For example, an individual user of a computer system in a population of computer systems targeted for maintenance or upgrade may use her computer in a very different manner from other users; or may have a very different work schedule; or may be situated in geographically distant location from other users where access to networks necessary for performing the maintenance or upgrade may not always be guaranteed. In situations where users perform atypical work with their computers, or have differing work schedules or work habits, the maintenance or upgrade should be performed in a manner that is minimally invasive to the users of the computer systems being maintained or upgraded, and which reflects the true needs of the user.

In other situations, for economic reasons a configuration-oriented approach to the performance of maintenance and upgrades may be viewed as unnecessarily wasteful. Upgrades of, for example, application software often require purchasing of a license covering the upgrade. If a particular user will not utilize the enhanced functionality associated with the upgrade, then it is fiscally wasteful to purchase a license for the user.

In other instances, it may be desirable to spawn maintenance actions or upgrades throughout an entire computer system population, but it may not be economically efficient to spawn maintenance actions or upgrades immediately. It is a fact of life that all consequences associated with maintenance and upgrades may not be understood when the maintenance and upgrade actions are performed. Accordingly, in certain instances, maintenance or upgrade actions may degrade the performance of or "crash" computer systems. Therefore it may be desirable to selectively spawn maintenance or upgrades among a target population of computer systems (in, for example, stages) so that if a "glitch" is encountered and the maintenance or upgrade crashes computer systems, then it impacts only a limited number of computer systems. Those skilled in the art seek methods and apparatus that are capable of determining who best to spawn maintenance and upgrades to first.

The foregoing examples operated from an institutional perspective, where institutions seek alternatives to configuration-dependent management and maintenance of computer systems. Individual users of computer systems have similar concerns on how best to manage and maintain the computer systems they use for performing productivity tasks.

For example, when performing productivity operations using a plurality of computer system resources (such as application programs), users typically perform a series of ancillary tasks associated with the productivity operations. These ancillary tasks may comprise backing up content as it is created; encrypting files for security purposes; scanning content for viruses, etc. A user may have different preferences on how to perform theses ancillary tasks depending on what the user is actually doing with the computer.

In further situations, different users of computer systems may perform differing tasks with the same, or very similar, set of computer resources. In such instances, maintenance or upgrade actions that ignore this reality may be economically inefficient as well. For example, although a particular user may utilize a software program, he may only require "basic" functionality. Again, it would be economically wasteful to purchase an upgrade license for the user when increased functionality would go unused.

Alternatively, an individual user may employ the same, or very similar, set of computer resources to accomplish a plurality of distinct tasks. In conventional practice, policies, permissions and procedures concerning use of, for example, an application program to accomplish each of the tasks cannot be set with respect to particular tasks of the plurality. Instead, the policies, permissions and procedures associated with use of the application program, if different for each task, have to be changed each time a user changes from one task of the plurality to perform another task of the plurality.

In yet other situations, the concern may differ from whether to perform a maintenance task or upgrade action. The concern may be whether a user of a computer system is utilizing important features of, for example, a software suite. It is not unusual for users to exhibit both a working knowledge of a software package sufficient to perform productivity tasks, and ignorance concerning how best to optimize the software package for their needs. For example, if a user of a computer system spends a significant portion of time every day authoring content with the computer system, then one would expect that the user would have instituted a frequent backup protocol to protect from content loss resulting from system crashes or other unexpected events. This does not always occur, however, because the user may be unfamiliar with mechanisms for instituting backup protocols.

In a somewhat related vein, a user may be experiencing problems with a computer, but may be only minimally competent to fix the problem himself. In other instances, not only is performing the maintenance or upgrade beyond the ken of a user, but simply describing or diagnosing problems encountered during use may provide insuperable problems for users that have only a minimal understanding of computer systems. In both instances, significant amounts of time may be wasted in seeking, for example, on-line or telephonic expert assistance. In such situations; authorities or agents responsible for managing computer systems of novice users seek methods and apparatus that automate much of routine management and maintenance actions, but do so in a manner where such actions are taken only on an as-needed basis.

In still further situations, a group of users may be participating in a collaborative activity, using a number of computer systems to engage in the collaborative activity. In such situations it is necessary that the computer systems be configured properly so that the collaboration may occur. This often requires granting of permissions, installing software upgrades, etc., so that each of the parties to the collaboration can access the collaborative environment and participate fully in the collaborative environment. Alternatively, if particularly sensitive material is the subject of the collaboration, and a specific party, although authorized to collaborate, fails to do so, then it may be advisable to revoke the authorization decision to preserve security. This is difficult to accomplish in practice, however, since the participation of system administrators often ends with the granting of permissions and installation of needed software, and it would be unusual for system administrators to be monitoring whether parties are actually participating in a collaborative activity.

Accordingly, those skilled in the art desire methods and apparatus that overcome the foregoing limitations of the prior art. In particular, those skilled in the art desire methods that take into consideration actual needs of users of the computer systems being managed, maintained and upgraded. In addition, those skilled in the art desire methods and apparatus that assist users to optimally utilize features of computer systems or resources. Further, those skilled in the art desire methods and apparatus that assist in the performance of maintenance and other tasks in a collaborative environment.

SUMMARY OF THE PREFERRED EMBODIMENTS

The foregoing and other problems are overcome, and other advantages are realized, in accordance with the following embodiments of the present invention.

A first embodiment of the invention comprises a signal-bearing medium tangibly embodying a program of machine-readable instructions executable by a digital processing apparatus of a computer to perform operations for managing a computer system on an activity basis. The operations performed when the program of machine-readable instructions is executed by the digital processing apparatus comprise: associating computer-system-related items with at least one activity to be performed using the computer system; establishing management procedures for use in managing the computer-system-related items associated with the at least one activity; and managing the computer-system-related items in accordance with the established management procedures during performance of the at least one activity.

A second embodiment of the invention comprises a signal-bearing medium tangibly embodying a program of machine-readable instructions executable by a digital processing apparatus of a computer system to perform operations for managing a computer system on an activity basis. The operations performed when the program of machine-readable instructions is executed by the digital processing apparatus comprise: monitoring use of the computer system to determine current actions being performed with the computer system; accessing a plurality of activity models, wherein each of the activity models describe a group of related actions performed using the computer system to accomplish a specific end; comparing the current actions being performed with the computer system with the activity models; identifying a particular activity model that best fits the current actions being performed with the computer system; accessing a management plan associated with the particular activity model, wherein the management plan establishes management procedures to be used in managing the computer system when actions corresponding to the activity model are detected as being performed with the computer system; and managing the computer system in accordance with the management procedures.

A third embodiment of the invention comprises a signal-bearing medium tangibly embodying a program of machine-readable instructions executable by a digital processing apparatus of a computer system to perform operations for managing a computer system resource on an activity basis. The operations performed when the program of machine-readable instructions is executed by the digital processing apparatus comprise: monitoring patterns of use of the computer system resource, wherein during the monitoring activity information is gathered characterizing patterns of use of the computer system resource; comparing information gathered while monitoring the patterns of use of the computer system resource with models characterizing preferred standards of use; determining based on the comparison whether improvements can be made to the use of the computer system resource; and if the determination is positive, instituting the improvements.

A fourth embodiment of the invention comprises a managing computer system for managing operations of client computer systems accessible over a network on an activity basis. The managing computer system comprises: at least one memory to store at least one program of machine-readable instructions, where the at least one program performs operations to manage the client computer systems accessible over the network when executed; a network interface coupled to the network for bi-directionally communicating with the client computer systems to be managed over the network; and digital processing apparatus coupled to the at least memory and the network interface for executing the at least one program of machine-readable instructions. When the digital processing apparatus executes the program at least the following operations are performed: monitoring use of the client computer systems to determine current actions being performed using the client computer systems; accessing a plurality of activity models, wherein each of the activity models describe a group of related actions performed using the computer system to accomplish a specific end; comparing the current actions being performed with the client computer systems with the activity models; for each client computer system, identifying a particular activity model that best fits the current actions being performed with the client computer system; for each client computer system, accessing a management plan associated with the activity model that best fits the current actions being performed with the client computer system; and for each client computer system, managing the client computer system in accordance with management procedures established by the management plan associated with the activity model that best fits the current actions being performed with the client computer system.

A fifth embodiment of the invention comprises a computer-implemented method for managing computer systems engaged in a collaborative activity, wherein the computer systems are coupled to a network. The method comprises the steps of: receiving identification of computer systems to be used in the collaborative activity; monitoring activities being performed using the computer systems involved in the collaborative activity; accessing an activity-based management plan to be used in managing the computer systems involved in the collaborative activity; and managing the computer systems involved in the collaborative activity in accordance with the activity-based management plan.

In conclusion, the foregoing summary of the various embodiments of the present invention is exemplary and non-limiting. For example, one or ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
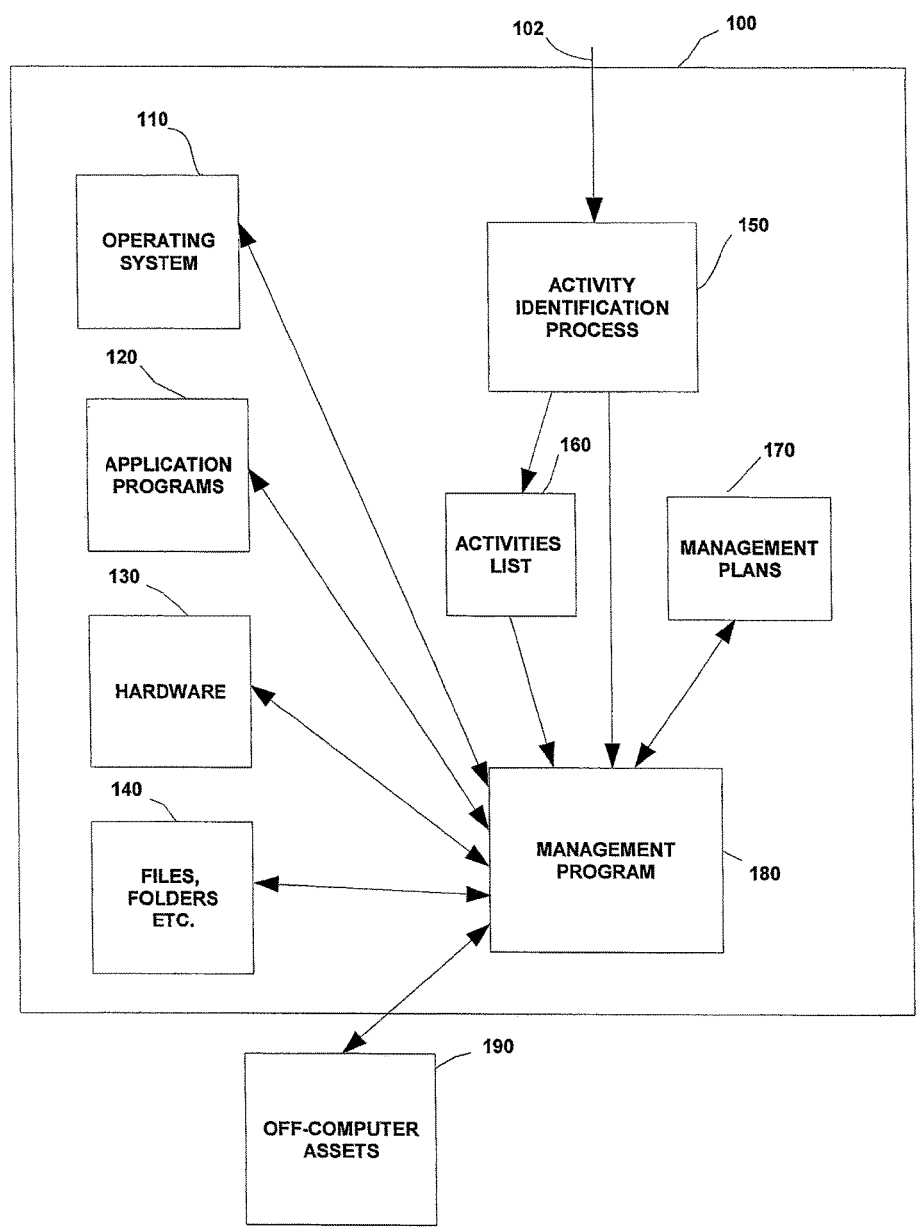
FIG. 1 is a block diagram conceptually depicting a computer system implementing aspects of the invention.

FIG. 1 is a block diagram conceptually depicting a computer system 100 incorporating aspects of the invention. Computer system 100 comprises an operating system 110; application programs 120; hardware 130; and files, folders, etc. 140. In addition, computer system 100 has software implementing aspects of the invention. In particular, the software comprises an activity identification process 150; activities list 160; management plans database 170; and a management program 180. "Activity" refers to a group of cohesive, related actions taken to accomplish a specific end. The actions typically involve operations performed using or operating on one or more computer-system-related items such as, for example, files 140; folders 140; application programs 120; calendars; calendar entries; communication resources; or off-computer assets 190 including, but not limited to, scanners; printers; or databases.

"Communications resources" as used herein comprise individual communications (such as, for example, e-mails; instant messages; faxes; voice messages, etc.); software communication resources (such as, for example, e-mail programs; instant messaging programs; voice messaging systems; fax programs, etc.); and hardware communication resources (such as, for example, network connections; modems, fax machines, telephone connections, intranets, etc).

Usually, there may be several separate activities the computer system 100 is used to perform, and different groups of computer-system-related items are associated with each of the separate activities. In addition, a unique management plan is typically established with respect to each separate activity. When the computer system 100 is used to perform a particular activity, the management plan associated with the particular activity is accessed by management program 180, and used to manage the computer-system-related items associated with the particular activity during performance of the activity.

Elements apparent in FIG. 1 will now be described in greater detail. During use of the computer system, activity identification process 150 receives a message 102 identifying that the computer system will be used to perform an activity listed in the activities list 160. This information is relayed to management program 180, which accesses a management plan from a database of management plans 170. The accessed management plan is associated with the particular activity identified by the message 102 received by the activity identification process 150, and establishes procedures indicating how the computer-system-related items associated with the activity are to be managed when the computer system is used to perform the activity.

In one embodiment, message 102 received by activity identification process 150 comes from a human user of the computer system 100, as the human user begins to use the computer system to perform one of the activities listed in activities list 160. In another embodiment, the message may be generated by an automated process monitoring actions being performed with the computer system. When actions being performed with computer system 100 match a particular activity, a message identifying the activity is generated and communicated to activity identification process 150.

Management plan database 170 typically comprises a plurality of management plans associated with each of the activities listed in activity list 160. Each of the management plans identifies a plurality of computer-system-related items associated with the activity, and establishes management procedures for managing the computer-system-related items when the computer system is used to perform the activity.

Management plans may implement application program updates; hardware updates; hardware maintenance; file backup; system backup; password procedures; biometric security procedures; file security; communication security; file compression; antivirus procedures; anti-spyware procedures; anti-malware procedures; file encryption; management of off-computer system assets; refilling of printing consumables; or refilling of consumables associated with printing images. This is an exemplary and non-limiting list of management actions which may be implemented by a management plan.

Figure 2:
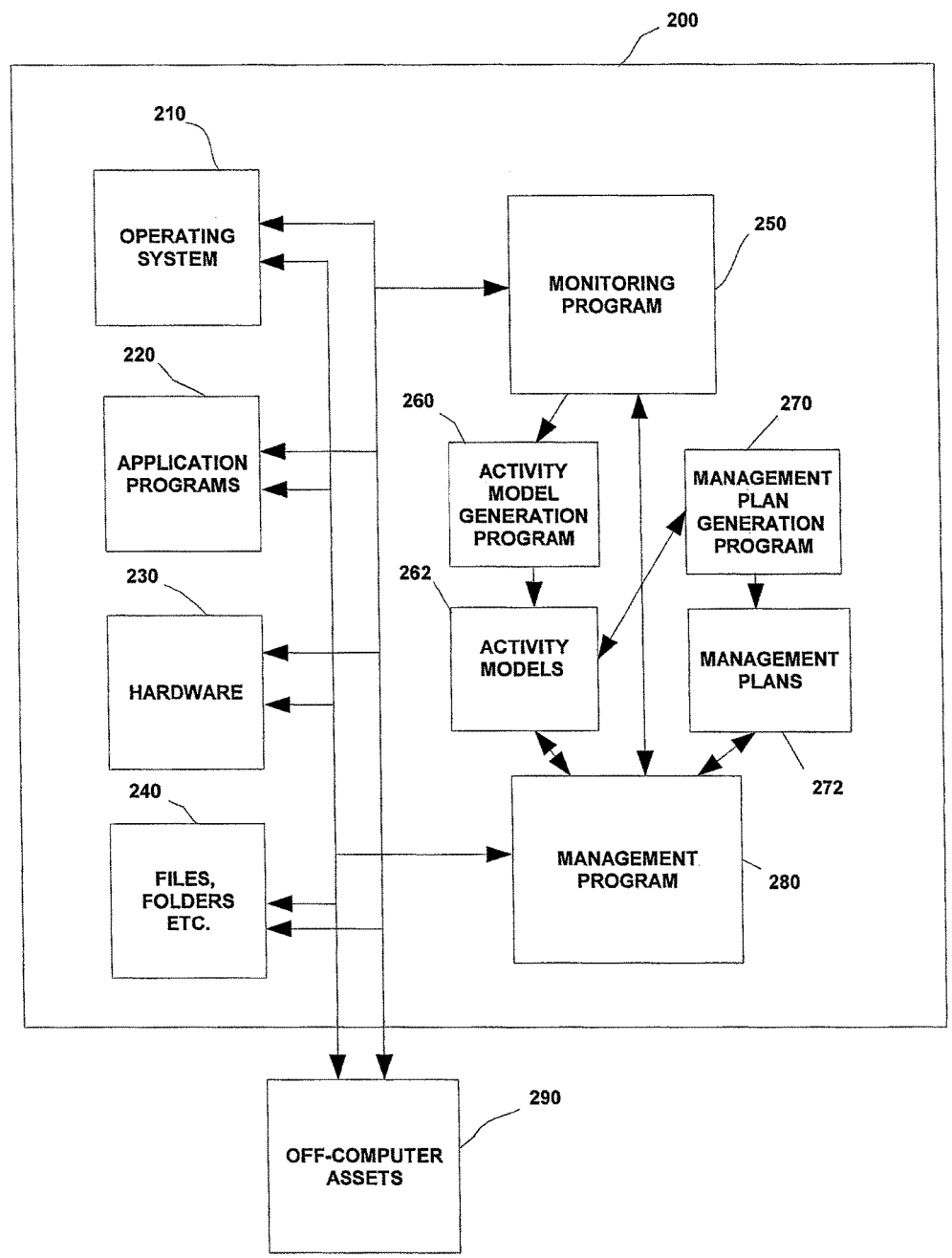
FIG. 2 is a block diagram conceptually depicting a computer system implementing aspects of the invention.

FIG. 2 is a block diagram conceptually depicting a computer system 200 incorporating software aspects capable of performing operations in accordance with another embodiment of the invention. Similar to the computer system 100 depicted in FIG. 1, computer system 200 comprises an operating system 210; application programs 220; hardware 230; files, folders, etc. 240. "Computer-system-related items" as used herein include, but are not limited to, items 210, 220, 230 and 240. "Computer-system-related items" as used herein also encompasses off-computer assets 290 such as, for example, databases, printers and scanners. Computer system 200 also has additional software features which implement aspects of the invention. In particular, the computer system 200 of the invention has installed a monitoring program 250 for monitoring actions performed using the computer system 200; an activity model generation program 260 for formulating activity models for describing groups of cohesive, related actions the computer system is used to perform to accomplish specific ends; a management plan generation program 270 for generating management plans 272 to be used in managing the computer system 200; and a management program 280 for managing the computer system 200 using the management plans 272 generated by the management plan generation program 270.

When a user of the computer system 200 is performing actions with computer system 200, monitoring program 250 monitors the actions and collects data and information that describe the actions. The actions are classified not only on the basis of software used, but also on the basis of actual actions taken. For example, if documents or photographs are printed this is tracked. When it becomes clear that a group of actions are being performed to accomplish a specific end, these actions are grouped together and characterized as an "activity". Typically, a plurality of separate activities is identified. The activities are then classified according to activity type, and the activities, once classified according to activity type, are grouped in categories. As time progresses, the monitoring program 250 develops a complete picture of the various activities that are performed with computer system 200.

As information is generated by monitoring program 250, activity model generation program 260 generates activity models 262 that capture functionally how computer system 200 is being used. The activity models 262 generated by the activity model generation program 260 describe life cycles of activities. For example, if a computer system is being used as a photographic processing and printing station, several operations are typically performed. First, images are scanned or downloaded from flash memory of a camera to memory of the computer system. Second, the images are manipulated using an image processing program. Third, the processed images are printed. The activity model generation program 260 of the invention generates an activity model 262 that captures the various stages and operations that are performed during photographic image processing. If the computer system 100 is being used to perform several distinct productivity operations, then an activity model is generated for each.

In another example, the activity of writing a book includes calls to agents, calendars of meetings, faxes to the copy editor, working on figures with a graphics tool, e-mail, word processing, instant messages to the book's publisher, and such. All of these "items" in the activity of book writing may together be backed up and encrypted according to the invention, and each activity may be managed differently with respect to these systems management functions.

After activity models 262 have been generated for each of the activities that the computer system 200 is used to perform, then management plan generation program 270 generates management plans 272 for each of the activity models 262. The management plans 272 indicate how the computer system is to be managed when actions corresponding to a particular activity model are detected as being performed with computer system 200. Referring back to the previous photographic image processing example, a management plan generated for that activity would anticipate needs much sooner than conventional software. For example, upon the scanning or downloading of images, the management plan would determine whether there were sufficient consumables (ink and paper) to accomplish an anticipated printing stage based on the number of images scanned or downloaded. In another example, if a user was scaling the images to a particular size, the management plan would determine whether the proper size paper was loaded in a printer. In a further example, the management plan would track the relative productivity of a user based on a current computer configuration and compare it to productivity achievable with an upgraded computer. If the management plan indicated that significant productivity gains could be made with an upgrade, then the management plan would command that the upgrade be performed.

Computer system management in the invention is performed by management program 280 which uses information generated by the monitoring program 250 and the management plans 272 generated by management plan generation program 280 to perform computer system management. The information generated by monitoring program 250 provides information for determining what actions are being currently performed with the computer system. This information is compared to activity models 262 to determine which activity model best describes the activity that is currently being performed. Then, the management plan associated with the activity model is selected from the management plan database 272 and used to perform computer system management as the activity is performed.

In an alternate embodiment, management plans may be pre-loaded based on activities that are expected to be performed with a computer system. In such situations, the activity model generation program 260 and management plan generation program 270 need not be installed. The monitoring program 250 and management program 280 would continue to operate, with the management program using pre-loaded management plans and possibly activity models to perform computer system management. Such pre-loaded management plans would be used with relatively mundane tasks like content generation. If word-processing tasks were being performed with computer systems and a company wanted to institute pre-determined practices on how activities associated with word processing tasks were to be performed, then a management plan instituting such practices would be spawned among the computer systems. When, based on activity patterns, it was determined that word processing activities were being performed, then the management program would access the management plan associated with word processing and apply it to the computer systems where word processing tasks were being performed. In one such example, when a user is generating new content rapidly, then the management plan may call for frequent backups to protect against loss of content. When a user slows down to contemplate what has been authored, then less frequent backups would occur.

The foregoing embodiments depicted in FIGS. 1 and 2 concerned the practice of the invention with respect to an individual computer. The teachings of the invention are likewise applicable in a network environment 300 like that depicted in FIG. 3. In the network example depicted in FIG. 3, a managing computer system 310 is tasked with performing activity-based management of client computer systems 320 over a network 330. Managing computer system 310 comprises software components like those depicted in FIGS. 1 and 2. Managing computer system 310 also has additional software functionality operating in accordance with the invention above that depicted in FIGS. 1 and 2 which permits the managing computer system 310 to perform activity-based management operations on a population of client computer systems 320. In particular, managing computer system 310 has a network interface 312 for bi-directionally communicating with the client computer systems 320 over the network. In addition, each of the client computers 320 has reporting software for reporting information describing activity patterns occurring on each of the client computer systems 320.

Figure 3:
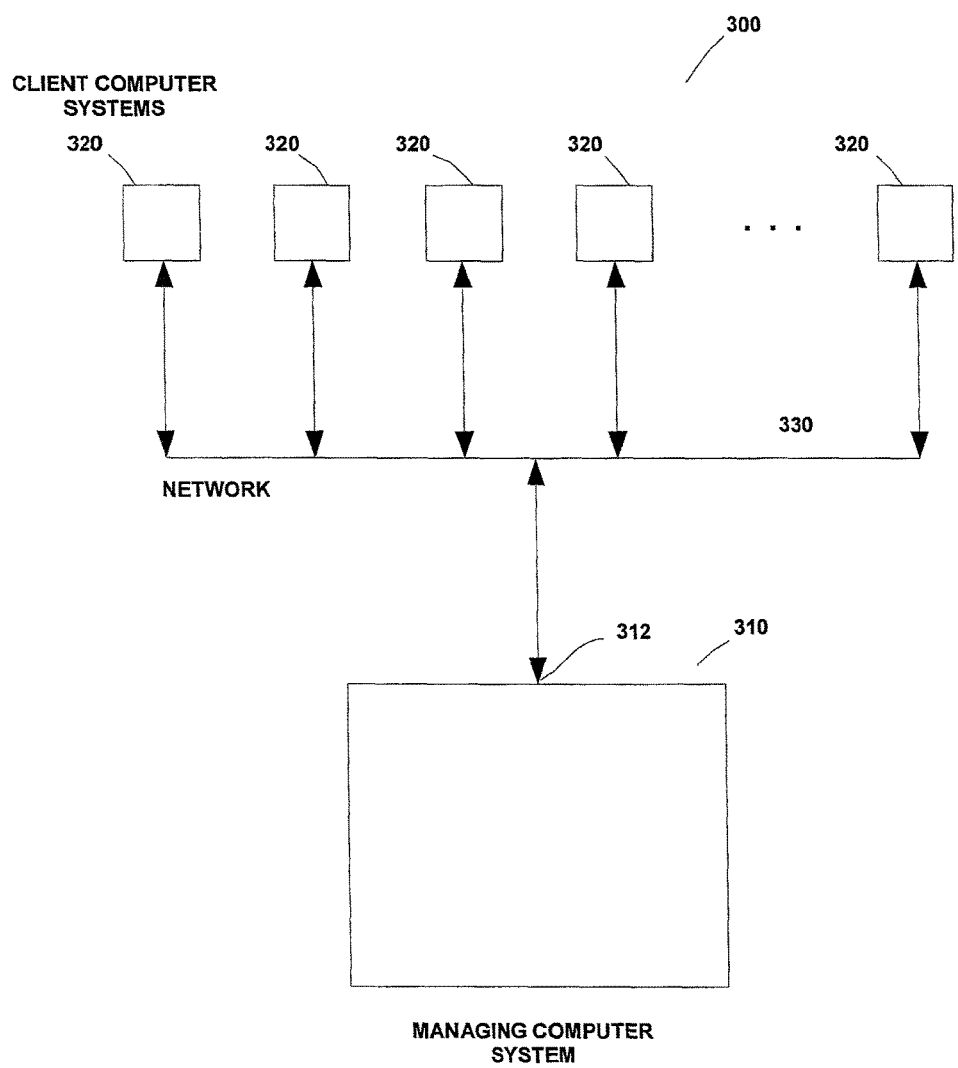
FIG. 3 is a block diagram depicting a network environment implementing aspects of the invention.

A particular advantage of the network-centric embodiment 300 depicted in FIG. 3 is that activity-based management can be applied to computer systems participating in a collaborative activity. In such an instance, permissions, security, maintenance and upgrades can be implemented on an activity basis across the network. In one possible embodiment, a user of a client computer system 320 would request permission to participate in a collaborative activity. If the user was granted permission, then activities of the user on the computer system would be monitored and a management plan instituted to manage the collaborative activity would be applied to the computer system of the user. In another embodiment, if it was determined that a user was authorized to participate in a collaborative activity but was not doing so, then a permission authorizing the collaboration could be revoked.

Another advantage of the network-centric approach depicted in FIG. 3 is that it accommodates activity-based management based on geographic location. For example, a particular client computer system depicted in FIG. 3 may comprise a portable computer system. In such instances, the user may transport the computer system back-and-forth between home and work. In order to preserve security, a protocol may be implemented that certain information is not to be forwarded to a user when at a remote location (for example, home), but the information may be forwarded to the user whenever the user is at a secure location (for example, work site). The managing computer system would monitor information relating to geographic location and perform the appropriate actions. In other situations, a user may utilize a portable computer for both personal and professional business. In such a situation, the user may desire to receive personal information (for example, e-mails received through a personal e-mail account) only when at home. In such an embodiment, managing computer system 300 would detect whenever a portable computer system was situated at a location identified as "personal" and then direct information identified as "personal" to the portable computer.

Figure 4:
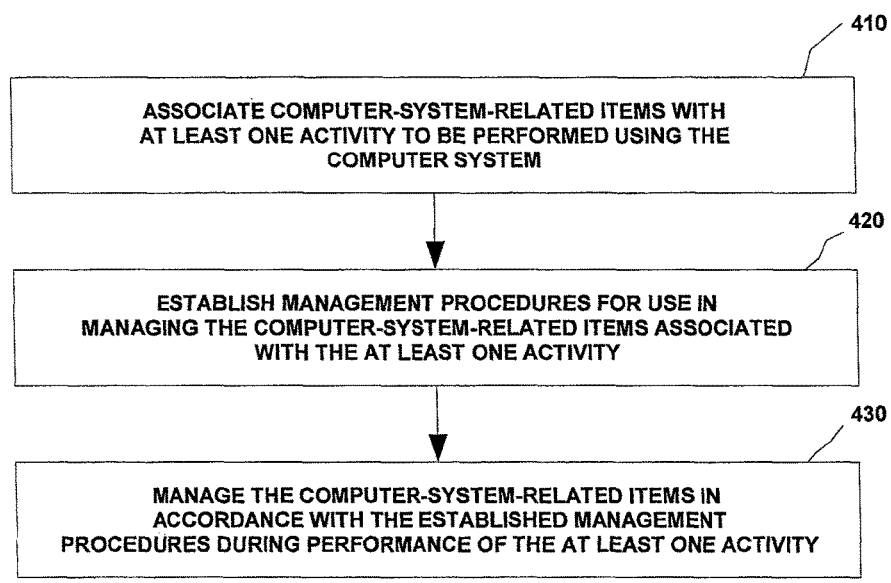
FIG. 4 is a flowchart depicting a method operating in accordance with the invention.

FIG. 4 is a flowchart depicting a method operating in accordance with the invention. A digital processing apparatus of a computer system executes program instructions, thereby performing operations that correspond to the steps of the method. At step 410, the digital processing apparatus executes instructions which associate computer-system-related items with at least one activity to be performed using the computer system. Next, at step 420, the digital processing apparatus executes instructions that establish management procedures for use in managing the computer-system-related items associated with the at least one activity. Then, at step 430, the digital processing apparatus executes instructions that manage the computer-system-related items in accordance with the established management procedures during performance of the at least one activity.

Although the method depicted in FIG. 4 is described with respect to at least one activity, it is a particular advantage of the invention that computer-system-related items can be associated with multiple activities, and can be managed differently depending on which activity is being performed by establishing different management procedures for each of the activities. In one variant of the method depicted in FIG. 4 implementing this aspect of the invention variants of the steps depicted in FIG. 4 are performed. For example, step 410 of associating computer-system-related items with at least one activity to be performed using the computer system further comprises associating computer-system-related items with a plurality of activities. Step 420 of establishing management procedures for at least one activity further comprises establishing separate management procedures for each of the plurality of activities. Finally, step 430 of managing the computer-system-related items in accordance with the established management procedures during performance of the at least one activity further comprises managing computer-system-related items associated with a particular activity in accordance with the management procedures established for the particular activity.

In a variant of the method depicted in FIG. 4 where management procedures are established for managing computer-system-related items associated with multiple activities additional steps are performed to provide the digital processing apparatus with an indication of which activity is being performed with the computer system. In this variant, after management procedures are established for managing the computer-system-related items associated with each of the plurality of activities, the digital processing apparatus executes instructions wherein an indication is received of which particular activity of the plurality of activities the computer system is being used to perform.

In a further variant of the method depicted in FIG. 4, additional steps are performed to identify an activity to be performed with the computer system to the digital processing apparatus. In the variant, prior to associating computer-system-related items with at least one activity to be performed using the computer system, an identification is received of the at least one activity. In one possible implementation, the identification is received from a user of the computer system. In another variant, the identification is received from an automated process monitoring patterns of use of the computer system.

In yet another variant of the method depicted in FIG. 4 the step of establishing management procedures is performed with the assistance of a user of the computer system. In this variant, establishing management procedures for use in managing the computer-system-related items associated with the at least one activity further comprises receiving preferences from a user of the computer system concerning management procedures.

In a still further variant of the method depicted in FIG. 4, management procedures are established using an automated process. In this variant, management procedures have been established beforehand based on activity classes. If an activity belongs to a particular activity class, the management procedures established for that particular activity class are used to manage computer-system-related items associated with that activity. In the variant, establishing management procedures further comprises the steps of: classifying the at least one activity according to activity class, wherein the at least one activity is identified as belonging to a particular activity class; and adopting pre-determined management procedures established for the particular activity class to manage the computer-system-related items associated with the activity.

In another variant of the method depicted in FIG. 4, the activity comprises a group activity to be performed using multiple computer systems. In this variant additional steps are performed. In a first additional step, the digital processing apparatus receives an identification of computer systems involved in the group activity. The step of associating computer-system-related items with the at least one activity further comprises associating computer-system-related items drawn from each of the computer systems involved in the group activity with the group activity. The step of establishing management procedures for use in managing the computer-system-related items associated with the at least one activity further comprises establishing management procedures for use in managing the computer-system-related items associated with the group activity, wherein the computer-system-related items are drawn from the computer systems involved in the group activity. The step of managing the computer-system-related items in accordance with the established management procedures further comprises managing the computer-system-related items associated with the group activity in accordance with the management procedures established for managing the computer-system-related items associated with the group activity.

The identification of the computer systems involved in the group activity may come from a participant in the group activity; a system administrator; or an automated process. In the case of the automated process, the process monitors actions being performed by individual computer systems in a population of computer systems. Computer systems being used to perform actions associated with the group activity are identified as involved in the group activity and managed as such.

Regarding "computer-system-related items", this term encompasses just about any computer related resource that may be managed in an automated, pre-programmed manner using functionality associated with a computer system. Examples of "computer-system-related items" comprise, but are not limited to: files; folders; databases; application programs; hardware; communication resources; etc.

Figure 5:
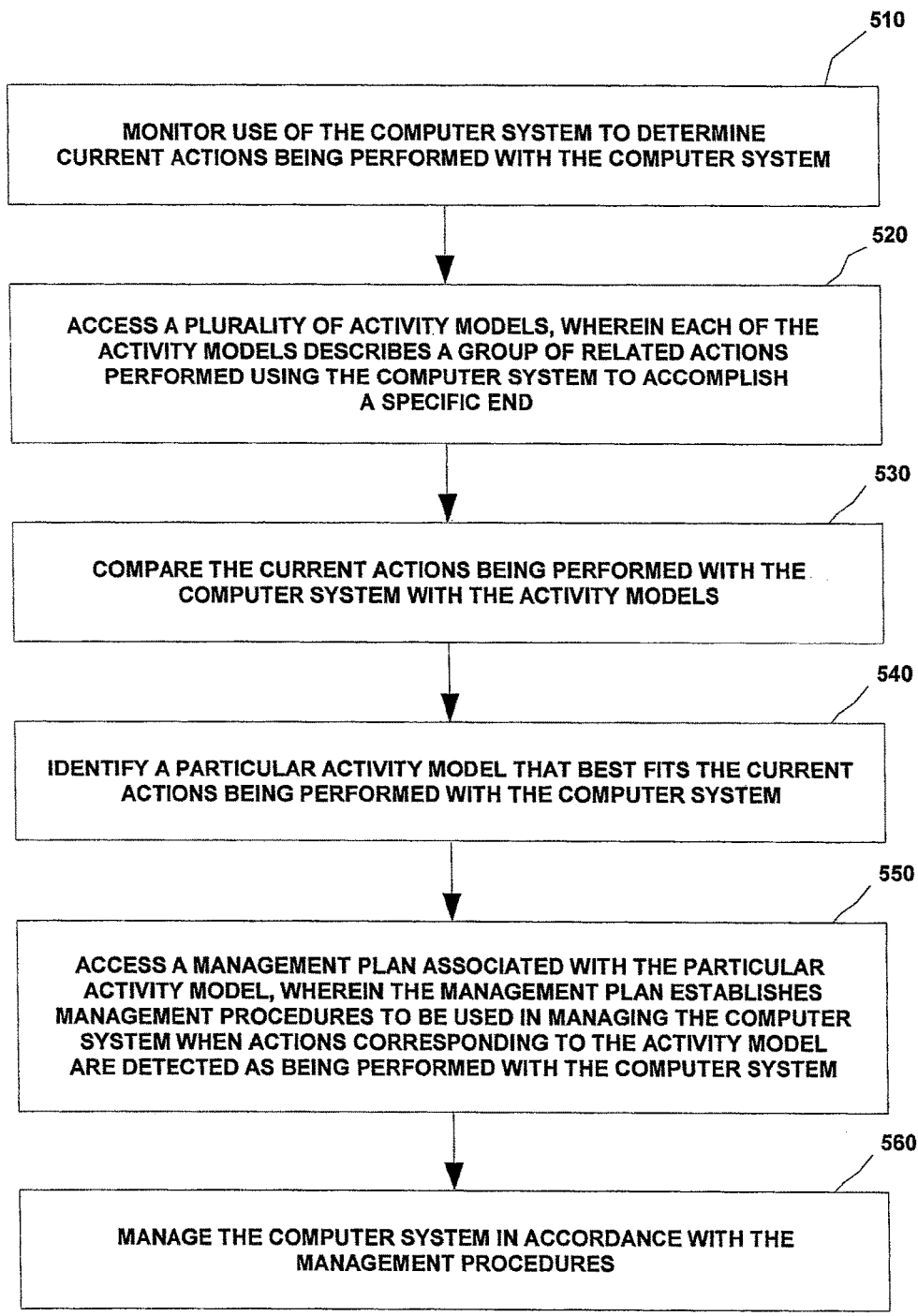
FIG. 5 is a flowchart depicting a method operating in accordance with the invention.

FIG. 5 is a flowchart depicting another method operating in accordance with the invention. In contrast to the method depicted in FIG. 4 which in certain variants operates, in part, based on human control, the method depicted in FIG. 4 operates in an automated manner using pre-determined activity models and management plans. At step 510, a computer system programmed to operate in accordance with the present invention monitors use of the computer system to determine current actions being performed with the computer system. Then, at step 520, the computer system accesses a plurality of activity models. Each of the activity models describes a group of related actions performed using the computer system to accomplish a specific end. Next, at step 530, the computer system compares the current actions being performed with the computer system with the activity models. Then, at step 540, the computer system identifies a particular activity model that best fits the current actions being performed with the computer system. Next, at step 550, the computer system accesses a management plan associated with the particular activity model. The accessed management plan establishes management procedures to be used in managing the computer system when actions corresponding to the activity model are detected as being performed with the computer system. Then, at step 560, the computer system manages the computer system in accordance with the management procedures.

In one variant of the method depicted in FIG. 5 additional operations are performed by a digital processing apparatus executing a program embodying the method. The additional operations occur before step 510, and comprise monitoring patterns of actions occurring over a period of time of sufficient duration to identify separate activities the computer system is being used to perform; and formulating the plurality of activity models in dependence on the monitoring of the patterns of actions. In another variant, after the activity models are formulated, a management plan is generated for each of the activity models.

In a further variant of the method depicted in FIG. 5, the digital processing apparatus executes additional instructions to perform the steps of: after the plurality of activity models and management plans have been generated, continuing to monitor actions being performed with the computer system; and generating at least one new activity model or management plan in dependence on the continued monitoring.

In yet another variant of the method depicted in FIG. 5, a user of a computer system is queried regarding her preferences in managing of the computer system. In this variant, the digital processing apparatus executes instructions to perform steps of: before managing the computer system using the management plan associated with the activity model, querying a user of the computer system regarding preferences respecting management of the computer system; receiving a response specifying at least one preference respecting management of the computer system; and wherein managing the computer system in accordance with the management procedures further comprises performing management of the computer system in dependence on the management procedures and the at least one preference.

In a still further variant of the method depicted in FIG. 5, the method advises the user of the impact of the management procedures on operations of the computer system. In this variant the digital processing apparatus executes instructions which perform the step of: before managing the computer system in accordance with the management procedures, advising a user of the computer system as to an impact of the management plan on operation of the computer system. Advising a user as to an impact may comprise indicating that the computer system may slow down periodically as management tasks are performed in the background.

Given that certain management tasks may have a momentary negative effect on the performance of the computer system, some users may want to opt out of certain management procedures, especially after being advised as to the impact of management procedures. Accordingly, in yet another variant of the method depicted in FIG. 5 the digital processing apparatus executes instructions to perform the steps of providing a user with an opportunity to opt out of at least one of the management procedures established by the management plan associated with the activity model; receiving a selection submitted by the user, wherein the selection opts out of at least one of the management procedures established by the management plan associated with the activity model; and disabling the management procedure corresponding to the selection submitted by the user when managing the computer system.

Figure 6:
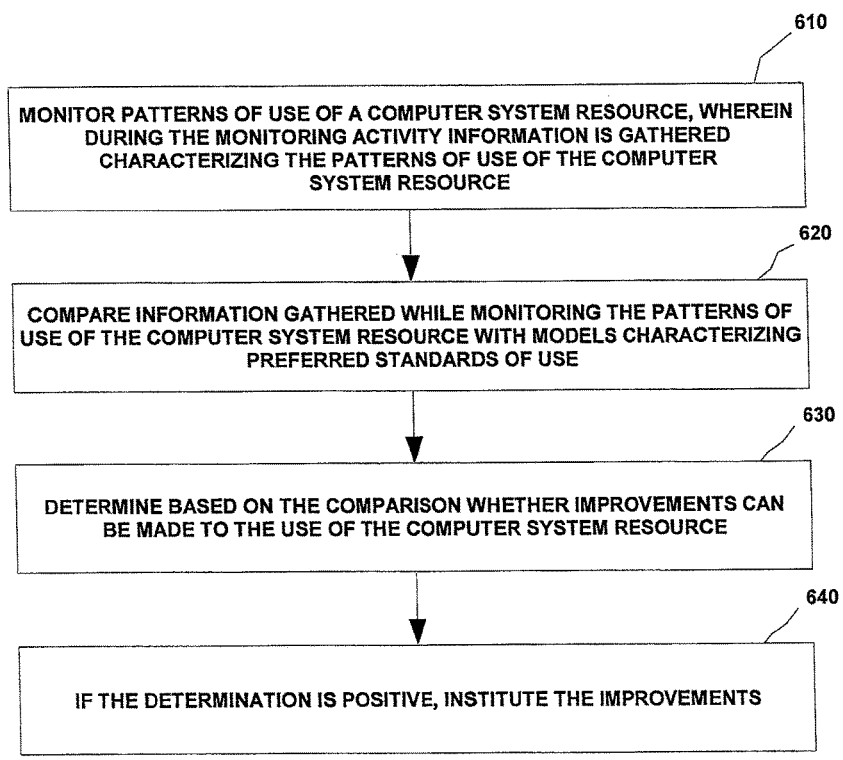
FIG. 6 is a flowchart depicting a method operating in accordance with the invention.

FIG. 6 is a flowchart depicting a further method operating in accordance with the invention. The method depicted in FIG. 6 in contrast to the preceding embodiments operates to manage an individual computer resource based on an activity basis, and not a plurality of computer-system-related items. At step 610, a computer system programmed to perform operations in accordance with this embodiment monitors patterns of use of the computer system resource, wherein during the monitoring activity information is gathered characterizing the patterns of use of the computer system resource. Then, at step 620, the computer system compares information gathered while monitoring the patterns of use of the computer system resource with models characterizing preferred standards of use. Next, at step 630, the computer system determines based on the comparison whether improvements can be made to the use of the computer system resource. Then, at step 640, if the determination is positive, the computer system institutes the improvements.

In one variant of the method depicted in FIG. 6, the improvements concern back-up procedures associated with the computer system resource; typically procedures involved with an application program. In another variant of the method depicted in FIG. 6, the improvements concern security procedures.

Figure 7:
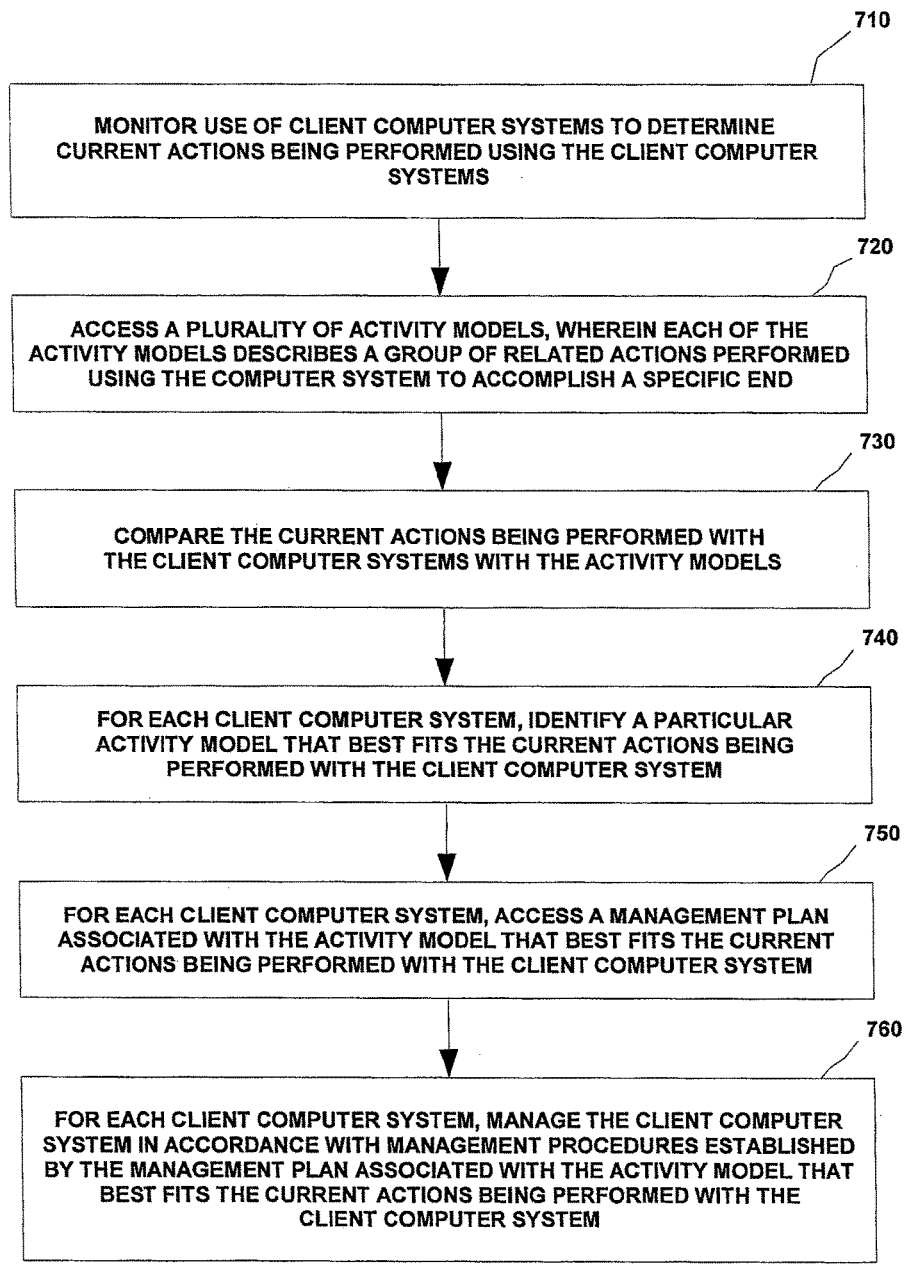
FIG. 7 is a flowchart depicting a method operating in accordance with the invention.

FIG. 7 is a flowchart depicting yet another method operating in accordance with the invention. The method depicted in FIG. 7 operates to manage client computer systems accessible over a network on an activity basis. A managing computer system having access to a common network shared with the client computer systems and programmed to manage the client computer systems performs the following operations. At step 710, the managing computer system monitors use of the client computer systems to determine current actions being performed using the client computer systems. Next, at step 720, the managing computer system accesses a plurality of activity models, wherein each of the activity models describe a group of related actions performed using the client computer systems to accomplish a specific end. Then, at step 730, the managing computer system compares the current actions being performed with the client computer systems with the activity models. Next, at step 740, for each client computer system, the managing computer system identifies a particular activity model that best fits the current actions being performed with the client computer system. Then, at step 750, for each client computer system, the managing computer system accesses a management plan associated with the activity model that best fits the current actions being performed with the client computer system. Next, at step 760, for each client computer system, the managing computer system manages the client computer system in accordance with management procedures established by the management plan associated with the activity model that best fits the current actions being performed with the client computer system.

In one alternate embodiment of the method depicted in FIG. 7 certain of the client computer systems are portable. In such an embodiment, monitoring patterns of use of the client computer systems comprises, at least, monitoring movement of the portable client computer systems between geographic locations. The management plan established to-manage such portable client computer systems institutes a management protocol that makes management decisions based on the geographic locations of the portable client computer systems. A typical management protocol instituted in this embodiment distinguishes between geographic locations where business is transacted and geographic locations corresponding to a residence of a user of the portable client computer system.

Figure 8:
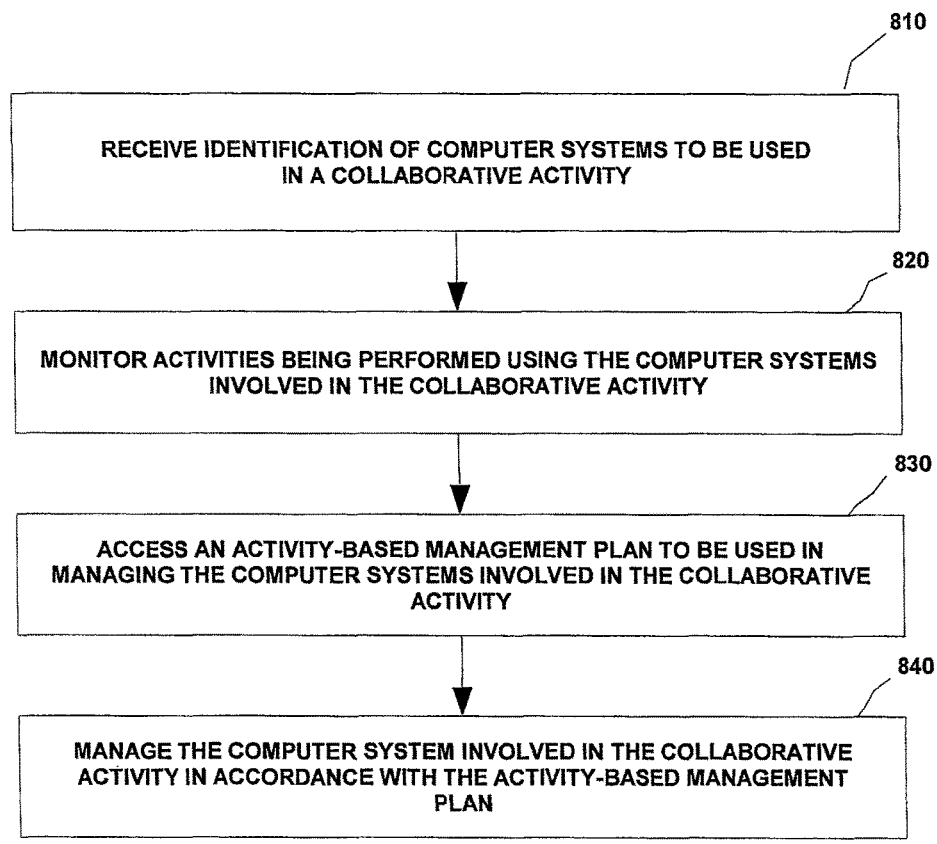
FIG. 8 is a flowchart depicting a method operating in accordance with the invention.

FIG. 8 is a flowchart depicts a still further method operating in accordance with the invention. The method depicted in FIG. 8 operates to manage computer systems involved in a collaborative activity on an activity basis. At step 810, a computer system identification process receives identification of computer systems to be involved in a collaborative activity. In various embodiments, the identification may come from users of the computer systems involved in the collaborative activity; a system administrator tasked with managing the computer systems involved in the collaborative activity; or an automated process monitoring actions being performed with computer systems in a population to determine which computer systems are being used to participate in the collaborative activity. Once this has been determined, the automated process generates a message which is communicated at step 810 identifying which computer systems from the population are participating in the collaborative activity. Then, at step 820, a computer system programmed to perform operations in accordance with the invention monitors actions being performed using the computer systems involved in the collaborative activity. Next, at step 830, the computer system accesses an activity-based management plan to be used in managing the computer systems involved in the collaborative activity. Then, at step 840, the computer system manages the computer systems involved in the collaborative activity in accordance with the activity-based management plan. As described previously, each management plan typically identifies a group of computer-system-related items associated with an activity (in this case a collaborative activity) and establishes management procedures for managing the computer-system-related items when the computer system is used to perform the activity. In the method depicted in FIG. 8, the method manages computer-system-related items drawn from each of the computer systems involved in the collaborative activity in accordance with the management plan established for the collaborative activity.

In one variant of the method depicted in FIG. 8, managing the computer systems involved in the collaborative activity in accordance with the activity-based management plan further comprises comparing the activities being performed using the computer systems involved in the collaborative activity with standards set forth in the activity-based management plan to determine whether the activities are being performed in accordance with the standards, and when it is determined that the activities are not being performed in accordance with the standards, instituting remedial actions. In one situation, the remedial actions comprise instituting improved use of software assets; and in another situation, the remedial actions concern security measures.

One of ordinary skill in the art will understand that methods depicted and described herein can be embodied in a computer program storable in a tangible computer-readable memory medium. Instructions embodied in the tangible computer-readable memory medium perform the steps of the methods when executed. Tangible computer-readable memory media include, but are not limited to, hard drives, CD- or DVD ROM, flash memory storage devices or in a RAM memory of a computer system.

Thus it is seen that the foregoing description has provided by way of exemplary and non-limiting examples a full and informative description of the best method and apparatus presently contemplated by the inventors for performing computer system management on an activity basis. One skilled in the art will appreciate that the various embodiments described herein can be practiced individually; in combination with one or more other embodiments described herein; or in combination with computer systems differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A non-transitory signal-bearing medium tangibly embodying a program of machine-readable instructions executable by a digital processing apparatus of a computer system to perform operations for managing a computer system on an activity basis, the operations comprising:
monitoring use of the computer system to determine current actions being performed by a user with the computer system and at least one current application program being used to perform the current actions;
generating a plurality of activity models from an activity model generation program;
accessing the plurality of activity models, wherein each one of the activity models describes a group of related actions performed using the computer system to accomplish a specific end and at least one application program used to perform the related actions;
comparing the current actions being performed with the computer system and the at least one current application program being used to perform the current actions with the activity models;
identifying a particular activity model that best fits the current actions being performed with the computer system, wherein identifying a particular activity model that best fits comprises monitoring patterns of actions with each pattern of action being monitored over a period of time, the monitored patterns of action occurring over a period of time of sufficient duration to form the particular activity model and using information from the monitored patterns to determine that the particular activity model best describes the current action being performed by comparing information from the monitored patterns with preferred standards of use;
generating at least one management plan from a management plan generation program and populating a database with the at least one generated management plan, the at least one generated management plan being generated for each activity model of the plurality of activity models;
associating at least one computer-system-related item identified by the at least one management plan from the database of management plans with at least one activity to be performed by a user using the computer system to manage the computer system on the activity basis and using the identified particular activity model, the at least one management plan being unique for each at least one activity;
where the at least one activity comprises at least one action performed by an application program using the at least one computer-system-related item;
accessing the at least one management plan through a management program;
establishing management procedures, through the at least one management plan, for use in managing the at least one computer-system-related item associated with the at least one activity when actions corresponding to the activity model are detected as being performed with the computer system;
detecting whether the at least one activity is being performed by the user; and
in response to detecting that the at least one activity is being performed, managing the at least one computer-system-related item in accordance with the established management procedures when performing the at least one action of the at least one activity.

2. The signal-bearing medium of claim 1 wherein associating at least one computer-system-related item with at least one activity to be performed using the computer system further comprises associating at least one computer-system-related item with a plurality of activities; and
wherein establishing management procedures further comprises establishing separate management procedures for each of the plurality of activities,
wherein the at least one computer-system-related item associated with a particular activity of the plurality of activities are managed in accordance with the management procedures established for the particular activity when the computer system is used to perform the particular activity.

3. The signal-bearing medium of claim 2 wherein the operations further comprise:
after management procedures are established for managing the at least one computer-system-related item associated with each of the plurality of activities, receiving an indication of which particular activity of the plurality of activities the computer system is being used to perform; and wherein managing the at least one computer-system-related item further comprises managing the at least one computer-system-related item associated with the particular activity in accordance with the management procedures established for the particular activity.

4. The signal-bearing medium of claim 1 wherein the operations further comprise:
prior to associating at least one computer-system-related item with at least one activity to be performed using the computer system, receiving an identification of the at least one activity.

5. The signal-bearing medium of claim 4 wherein receiving an identification further comprises receiving an identification of the activity from a user of the computer system.

6. The signal-bearing medium of claim 4 wherein receiving an identification further comprises receiving an identification of the activity from an automated process monitoring use patterns of the computer system.

7. The signal-bearing medium of claim 1 wherein establishing management procedures for use in managing the at least one computer-system-related item associated with the at least one activity further comprises receiving preferences concerning management procedures from at least one entity selected from the group of: a user; a company; a third-party service; an automated software agent.

8. The signal-bearing medium of claim 6 wherein establishing management procedures for use in managing the at least one computer-system-related item associated with the at least one activity further comprises:
classifying the at least one activity according to activity class, whereby the at least one activity is identified as belonging to a particular activity class; and
adopting pre-determined management procedures established for the particular activity class.

9. The signal-bearing medium of claim 1 wherein the at least one computer-system-related item comprise at least one selected from the group of: files; folders; databases; communication resources; calendars; calendar resources; calendar entries.

10. The signal-bearing medium of claim 1 wherein the at least one activity further comprises a group activity, the operations further comprising:

receiving an identification of computer systems involved in the group activity;

wherein associating at least one computer-system-related item with the at least one activity further comprises associating at least one computer-system-related item drawn from each of the computer systems involved in the group activity with the group activity;

wherein establishing management procedures for use in managing the at least one computer-system-related item associated with the at least one activity further comprises establishing management procedures for use in managing the at least one computer-system-related item associated with the group activity, wherein the at least one computer-system-related item are drawn from the computer systems involved in the group activity; and wherein managing the at least one computer-system-related item in accordance with the established management procedures further comprises managing the at least one computer-system-related item associated with the group activity in accordance with the management procedures established for managing the at least one computer-system-related item associated with the group activity.

11. The signal-bearing medium of claim 1, where the at least one activity comprises generating content, and managing the at least one computer-system-related item comprises adjusting a frequency of performing backups.

12. A non-transitory signal-bearing medium tangibly embodying a program of machine-readable instructions executable by a digital processing apparatus of a computer system to perform operations, the operations comprising:

monitoring patterns of use by observing actions over time by a user performing actions with at least one application program using at least one computer system resource in a first configuration, wherein during the monitoring activity information is gathered characterizing patterns of use of the computer system resource and characterizing the at least one application program using the at least one computer system resource;

generating a plurality of models from a model generation program;

accessing the plurality of models characterizing preferred standards of use, wherein each one of the models describes a group of related actions performed using the computer system to accomplish a specific end and at least one application program used to perform related actions;

comparing the activity information gathered with the models characterizing preferred standards of use;

identifying a particular model that best fits the actions being performed with the computer system, wherein identifying a particular model that best fits comprises monitoring patterns of actions with each pattern of action being monitored over a period of time, the monitored patterns of action occurring over a period of time of sufficient duration to form the particular activity model and using information from the monitored patterns to determine that the particular model best describes the action being performed by comparing information from the monitored patterns with preferred standards of use;

generating at least one management plan from a management plan generation program and populating a database with the at least one generated management plan, the at least one generated management plan being generated for each model of the plurality of models;

determining based on the comparison and the first configuration whether improvements can be made to the use of the computer system resource; and if the determination is positive, instituting the improvements with a second configuration;

accessing a management plan associated with a particular identified model, wherein the management plan establishes management procedures to be used in managing the computer system when actions corresponding to the particular identified model are detected as being performed with the computer system;

wherein the performed operations manage the computer system resource on an activity basis using an activity model through the management plan, the management plan being unique for the activity information gathered and being accessed by the activity information gathered through a management program.

13. The signal-bearing medium of claim 12 wherein the improvements concerns backup procedures.

* * * * *